United States Patent
Peruch et al.

(10) Patent No.: US 11,572,422 B2
(45) Date of Patent: Feb. 7, 2023

(54) RECYCLABLE CROSS-LINKED DIENE ELASTOMERS COMPRISING FURANYL GROUPS AND PRECURSORS THEREOF

(71) Applicants: UNIVERSITÉ DE BORDEAUX, Bordeaux (FR); INSTITUT POLYTECHNIQUE DE BORDEAUX, Talence (FR); Centre national de la recherche scientifique, Paris (FR)

(72) Inventors: Frédéric Peruch, Gradignan (FR); Pierre Berto, Coimeres (FR); Stéphane Grelier, Parentis-en-Born (FR)

(73) Assignees: UNIVERSITÉ DE BORDEAUX, Bordeaux (FR); INSTITUT POLYTECHNIQUE DE BORDEAUX, Talence (FR); Centre national de la recherche scientifique, Paris (FR)

( * ) Notice: Subject to any disclaimer, the term of this patent is extended or adjusted under 35 U.S.C. 154(b) by 271 days.

(21) Appl. No.: 16/764,574

(22) PCT Filed: Nov. 16, 2018

(86) PCT No.: PCT/EP2018/081624
§ 371 (c)(1),
(2) Date: May 15, 2020

(87) PCT Pub. No.: WO2019/097019
PCT Pub. Date: May 23, 2019

(65) Prior Publication Data
US 2022/0213234 A1 Jul. 7, 2022

(30) Foreign Application Priority Data

Nov. 17, 2017 (EP) .................... 17306595

(51) Int. Cl.
*C08C 19/06* (2006.01)
*C08C 19/22* (2006.01)
(Continued)

(52) U.S. Cl.
CPC .............. *C08C 19/06* (2013.01); *C08C 19/22* (2013.01); *C08C 19/38* (2013.01); *C08L 15/00* (2013.01); *C08L 2207/20* (2013.01)

(58) Field of Classification Search
CPC . C08C 19/04; C08C 19/22; C08F 8/06; C08F 8/30; C08F 2810/40
See application file for complete search history.

(56) References Cited

U.S. PATENT DOCUMENTS

| 4,687,812 A * | 8/1987 | Dickie ............... C08G 61/12 525/484 |
| 10,280,130 B2 * | 5/2019 | Kennedy ............. C07C 29/58 |

(Continued)

FOREIGN PATENT DOCUMENTS

CN 107 245 134 A 10/2017

OTHER PUBLICATIONS

Swanson, Macromolecules, 2010, 43, 6135-6141 (Year: 2010).*
(Continued)

*Primary Examiner* — Robert C Boyle
(74) *Attorney, Agent, or Firm* — Troutman Pepper Hamilton Sanders LLP

(57) ABSTRACT

The present invention concerns new precursors of recyclable cross-linked diene elastomers comprising at least one furanyl group along the chain and comprising chain-end units with furanyl groups, their use in the preparation of said recyclable elastomers and their process of preparation. The invention also concerns new recyclable cross-linked diene elastomers, their preparation process and their uses.

13 Claims, 7 Drawing Sheets

(51) Int. Cl.
C08C 19/38 (2006.01)
C08L 15/00 (2006.01)

(56) References Cited

U.S. PATENT DOCUMENTS

2002/0086952 A1\* 7/2002 Chino .................. C08L 19/006
525/327.6
2010/0099798 A1\* 4/2010 Costanzo .............. C08F 222/40
523/180

OTHER PUBLICATIONS

European Search Report issued in corresponding European Patent Application No. 17 30 6595 dated Jun. 26, 2018.
International Search Report issued in corresponding International Patent Application No. PCT/EP2018/081624 dated May 7, 2019.
Berto, P., et al. "Telechelic Polybutadienes or Polyisoprenes Precursors for Recyclable Elastometic Networks" Macromolecular Rapid Communications 38(1700475):1-6 (2017) cited in EP SR and ISR.
Swanson, J. P., et al. "Development of Polymeric Phase Change Materials On the basis of Diels-Alder Chemistry" Macromolecules 43:6135-3141 (2010) cited in EP SR and ISR.

\* cited by examiner

RECYCLABLE CROSS-LINKED DIENE ELASTOMERS COMPRISING FURANYL GROUPS AND PRECURSORS THEREOF

CROSS REFERENCE TO RELATED APPLICATIONS

This is a U.S. National Phase Application under 35 U.S.C. § 371 of International Patent Application No. PCT/EP2018/081624, filed Nov. 16, 2018, which claims priority of European Patent Application No. 17306595.4, filed Nov. 17, 2017. The entire contents of which are hereby incorporated by reference.

FIELD OF THE INVENTION

The present invention concerns new precursors of recyclable cross-linked diene elastomers, their use in the preparation of said recyclable elastomers and their process of preparation. The invention also concerns new recyclable cross-linked diene elastomers, their preparation process and their uses.

BACKGROUND

In 2015, the total rubber production was over 26 millions of tons. Natural and synthetic rubbers like polyisoprene, polyethylene/propylene/diene (EPDM) or polybutadiene (PB) are widely used in many areas like automotive, sport equipment, building materials or tires. Their elasticity, strength, high moduli or solvent resistance are the main properties expected for these materials. To reach these properties, the rubber has to be chemically cross-linked. Sulfur vulcanization and peroxide curing are currently the main methods used in industry. However, the network produced by these pathways is irreversibly cross-linked. As a consequence, the material cannot be correctly recycled and leads to important quantities of wastes.

SUMMARY

Recently, new routes to synthesize reversible cross-linked materials were investigated. Among reversible reactions, the Diels-Alder (DA) reaction has already been tested on a wide range of polymers like polyurethane, epoxy or recently on polybutadiene to create reversible network. One of the most popular DA reaction involves a furan and a maleimide leading to an adduct that can dissociate under thermal treatment with few side reactions in mild reaction conditions.

The thiol-ene reaction is used to graft furanyl groups along a polybutadiene chain. The bis-maleimide, used as the cross-linking agent, is then added to the modified elastomer to form a thermosensitive dynamic network. However, several disadvantages have to be considered with the thiol-ene reaction: some side reactions like cyclization or uncontrolled cross-linking can occur. Moreover, the molar mass of the polybutadiene used is high, comprised between 135 and 200 kg·mol$^{-1}$, increasing solubilization time, washing steps and complicating chemical characterization or molding due to this high viscosity.

Other studies have also described the synthesis of reversible PB networks by grafting furan groups or carboxylic acids through thiol-ene reaction (J. Bai, H. Li, Z. Shi, J. Yin, *Macromolecules* 2015, 48, 3539; and D. Wang, J. Guo, H. Zhang, B. Cheng, H. Shen, N. Zhao, J. Xu, *J. Mater. Chem. A* 2015, 3, 12864). However, in all cases, the starting polymer had a high molar mass (>200 kg·mol$^{-1}$) and a high content of 1,2 units (15 to 90%). Moreover, side reactions like coupling or cyclization of the 1,2-units could occur during the thiol-ene reaction (L. Lotti, S. Coiai, F. Ciardelli, M. Galimberti, E. Passaglia, *Macromol. Chem. Phys.* 2009, 210, 1471; N. ten Brummelhuis, C. Diehl, H. Schlaad, *Macromolecules* 2008, 41, 9946; B. Korthals, M. C. Morant-Miñana, M. Schmid, S. Mecking, *Macromolecules* 2010, 43, 8071; D. Lenko, S. Schlögl, A. Temel, R. Schaller, A. Holzner, W. Kern, *J. Appl. Polym. Sci.* 2013, 129, 2735; J. Justynska, Z. Hordyjewicz, H. Schlaad, *Polymer* 2005, 46, 12057; and H. Leicht, S. Huber, I. Göttker-Schnetmann, S. Mecking, *Polym. Chem.* 2016, 7, 7195). Improvement of the mechanical properties of the networks cannot therefore be attributed only to formation of the network but also to side reactions.

There is thus a need to provide new precursors for the preparation of recyclable cross-linked diene elastomers and new recyclable cross-linked diene elastomers thereof. In particular, there is a need to provide precursors of recyclable cross-linked diene elastomers which can be easily and efficiently obtained and used in the industry, and especially having a low viscosity.

The aim of the present invention is to provide new compounds, in particular useful as precursors for the preparation of recyclable cross-linked diene elastomers.

A particular aim of the invention is to provide precursors for the preparation of recyclable cross-linked diene elastomers having a low viscosity and which are easy to use in said preparation process.

An aim of the invention is to provide a process of preparation of such precursors.

Another aim of the invention is to provide new recyclable cross-linked diene elastomers, in particular recyclable polybutadiene, polyisoprene, and polychloroprene.

A particular aim of the invention is to provide new thermoreversible cross-linked diene elastomers.

Another aim of the invention is to provide a process of preparation of said recyclable cross-linked diene elastomers.

Another aim of the present invention is to provide reversible and well-defined rubber networks from liquid low molar mass elastomers, such as polybutadiene or polyisoprene with a high content of 1,4-cis units, obtained from the controlled degradation of high molar mass 1,4-cis-PI and 1,4-cis-PB.

Therefore, the present invention relates to a compound having the following formula (I)

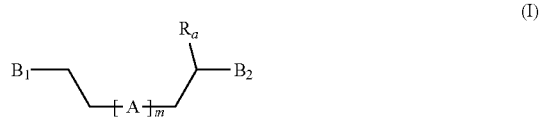

wherein:

m is an integer comprised between 1 and 10,000, and preferably between 50 and 1,000;

$B_1$ and $B_2$, independently of each other, have the following formula (B):

(B)

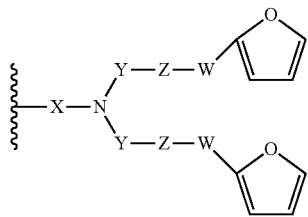

or the following formula (C):

(C)

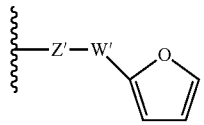

wherein:
X is:
  a bond or
  a group of formula —NH—$X_1$—, wherein $X_1$ is a linear or branched ($C_1$-$C_5$)alkylene group;
Y is selected from the linear and branched ($C_1$-$C_5$) alkylene groups;
Z and Z' are independently of each other —O— or —NH—;
W and W' are independently of each other selected from the group consisting of: —C(=O)—NH—Y'—, —C(=O)—Y'—, and —Y'— groups, Y' representing a linear or branched ($C_1$-$C_5$)alkylene group, preferably a ($C_1$-$C_3$)alkylene group;
$R_a$ is selected from the group consisting of: H, linear or branched ($C_1$-$C_5$)alkyl, and halogen atom;
A comprises at least one repeating unit having the following formula (U1)

(U1)

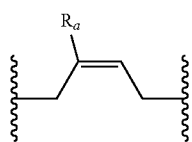

and at least one repeating unit having one of the following formulae (U'1) and (U'2):

(U'1)

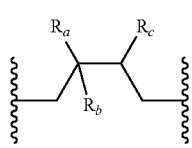

(U'2)

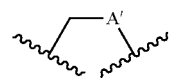

and optionally at least one further repeating unit having the following formula (U2):

(U2)

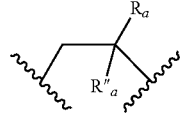

wherein the repeating units of A are randomly distributed, and
wherein A comprises at least 5% in number of units (U1) in relation to the total number of units (U1), (U2), (U'1), and (U'2);
wherein:
  $R_a$ is as defined above;
  $R_a''$ is selected from the group consisting of H, —CH=$CH_2$, and —C(=$CH_2$)($R_a$), $R_a$ being as defined above;
  $R_b$ is H and $R_c$ is $B_3$ having the formula (C) as defined above, or $R_b$ is $B_3$ having the formula (C) as defined above and $R_c$ is H;
A' is chosen from the following groups:

(1)

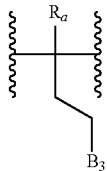

(2)

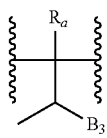

(3)

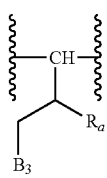

(4)

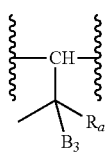

$R_a$ and $B_3$ being as defined above.

The present inventors surprisingly synthesized well-defined thermoreversible cross-linked diene elastomers by using easy and efficient chemistry for chain modifications, in particular by using chain-ends units comprising furanyl groups in their precursors, said precursors also comprising at least one furanyl group along the backbone of the chain.

Starting from low molar mass polymer allowed a better characterization, lower solubilization time and easier processability for molding of the final material.

In the precursors of formula (I) according to the invention, furan groups are grafted along the backbone and at the chain-ends, for example with a furan content of 10%.

More particularly, the inventors discovered new precursors of said elastomers by first degrading commercial high molar mass diene elastomers into polymers with lower molar masses, leading to a significant decrease of the viscosity of the polymers. For example, the molar mass of the degraded commercial elastomers, in particular of degraded commercial polybutadiene, ranges from 1,000 g·mol$^{-1}$ to 50,000 g·mol$^{-1}$, preferably from 1,000 g·mol$^{-1}$ to 25,000 g·mol$^{-1}$, and more particularly from 5,000 g·mol$^{-1}$ to 20,000 g·mol$^{-1}$.

From these polymers, furanyl functionalized precursors were prepared. The addition of a cross-linking agent to these precursors surprisingly yields to various cross-linked diene elastomers.

According to the invention, the cross-linking is thermoreversible: the diene elastomers of the invention are in particular usable in a temperature range comprised between −90° C. and +130° C., preferably between −45° C. and +130° C. without losing their mechanical properties.

Moreover, the cross-linked diene elastomers of the invention surprisingly keep their mechanical properties after several remolding cycles, for example after 1 to 5 cycles of remolding.

Lastly, it was discovered that the mechanical properties of the diene elastomers network can be tuned by monitoring the quantity of the cross-linking agent used in their preparation process.

Definitions

By "mechanical properties", it may be meant the elasticity, in particular characterized by the elastic modulus and the loss modulus, the young modulus, the maximum stress at break and the maximum strain at break.

By "low viscosity", it is meant a viscosity comprised between 0.1 and 3,000 Pa·s.

The term "$(C_1-C_5)$alkyl" means a saturated aliphatic hydrocarbon group which may be straight or branched having from 1 to 5 carbon atoms in the chain (i.e. an alkane missing one hydrogen atom).

The term "$(C_1-C_{10})$alkyl" means a saturated aliphatic hydrocarbon group which may be straight or branched having from 1 to 10 carbon atoms in the chain (i.e. an alkane missing one hydrogen atom).

Preferred alkyl groups are methyl, ethyl, propyl or iso-propyl groups, more particularly methyl groups. "Branched" means that one or lower alkyl groups such as methyl, ethyl or propyl are attached to a linear alkyl chain.

The term "$(C_1-C_5)$alkylene" means a saturated aliphatic hydrocarbon divalent group which may be straight or branched having from 1 to 5 carbon atoms in the chain (i.e. an alkane missing two hydrogen atoms).

The term "$(C_1-C_{20})$alkylene" means a saturated aliphatic hydrocarbon divalent group which may be straight or branched having from 1 to 20 carbon atoms in the chain. (i.e. an alkane missing two hydrogen atoms).

Preferred alkylene groups are methylene, ethylene or propylene groups. "Branched" means that one or lower alkylene groups such as methylene, ethylene or propylene are attached to a linear alkylene chain.

By a "trivalent linear or branched $(C_1-C_{10})$alkane" is meant a saturated aliphatic hydrocarbon group having from 1 to 10 carbon atoms and missing three hydrogen atoms, with the terms "linear" or "branched" as defined for the alkyl groups. For example, R' is a trivalent $(C_1-C_{10})$alkane in formula (VIII) and is thus an alkane linked to the three nitrogen atoms of formula (VIII).

By a "trivalent $(C_6-C_{10})$ arene", is meant an aromatic monocyclic, bicyclic, or tricyclic hydrocarbon ring system comprising from 6 to 10 carbon atoms and missing three hydrogen atoms. For example, R' is a trivalent $(C_6-C_{10})$ arene in formula (VIII) and is thus an arene linked to the three nitrogen atoms of the compounds of formula (VIII).

The term "halogen" refers to the atoms of the group 17 of the periodic table and includes in particular fluorine, chlorine, bromine, and iodine atoms, more preferably fluorine, chlorine and bromine atoms. In a particular embodiment, the halogen is the chlorine atom.

All diastereoisomeric forms (cis and trans; Z and E) and all geometric isomeric forms of the compounds and polymers of the invention are intended, unless the diastereoisomeric or the isomeric form is specifically indicated.

Precursors of general formula (I)

By "precursors", "precursors of the invention" or "precursors of the recyclable cross-linked diene elastomers", it is meant compounds of formula (I) as described above.

According to one embodiment, the precursors of formula (I) comprise at least one repeating unit (U1), at least one repeating unit (U2), and at least one unit (U'1) or (U'2).

According to one embodiment, the precursors of formula (I) comprise at least one repeating unit (U1), at least one repeating unit (U2), at least one unit (U'1) and at least one unit (U'2).

In one embodiment, the repeating units (U1) are identical. In one embodiment, the repeating units (U1) are different.

As mentioned above, A comprises at least 5% in number of units (U1) in relation to the total number of units (U1), (U2), (U'1), and (U'2). According to an embodiment, A comprises at least 10%, preferably at least 15%, even at least 20%, in particular at least 30%, and more preferably at least 50% in number of units (U1) in relation to the total number of units (U1), (U2), (U'1), and (U'2).

According to a preferred embodiment, A comprises at least 60%, preferably at least 70%, even at least 75%, in particular at least 80%, and more preferably at least 85% in number of units (U1) in relation to the total number of units (U1), (U2), (U'1), and (U'2).

According to a preferred embodiment, A comprises at least 90%, preferably at least 92%, even at least 95%, in particular at least 97%, and more preferably at least 98% in number of units (U1) in relation to the total number of units (U1), (U2), (U'1), and (U'2).

In one embodiment, the repeating units (U'1) are identical. In one embodiment, the repeating units (U'1) are different. In particular, the precursors of formula (I) may comprise at least one unit (U'1) wherein $R_b$ is H and $R_c$ is $B_3$ having the formula (C) as defined above and at least one unit (U'1) wherein $R_b$ is $B_3$ having the formula (C) as defined above and $R_c$ is H.

In one embodiment, the repeating units (U'2) are identical. In one embodiment, the repeating units (U'2) are different. In particular, the precursors of formula (I) may comprise at least one unit (U'2) wherein A' has one of the formulae (1), (2), (3) or (4) and at least another unit (U'2) wherein A' is different and has one of the formulae (1), (2), (3) or (4).

In one embodiment, the repeating units (U2) are identical. In one embodiment, the repeating units (U2) are different. In particular, the precursors of formula (I) may comprise at least one unit (U2) wherein R''$_a$ is —CH═CH$_2$ and at least one unit (U2) wherein R''$_a$ is —C(═CH$_2$)(R$_a$).

According to an embodiment, in formula (I), A comprises from 1 to 10,000, and preferably from 50 to 1,000 units (U1).

According to an embodiment, in formula (I), A comprises from 1 to 5,000, and preferably from 5 to 500 units (U'1) or (U'2).

In one embodiment, $R_a$ is H or a $(C_1-C_5)$alkyl group, preferably $R_a$ is H or $CH_3$. In a particular embodiment, $R_a$ is H. In one embodiment, $R_a''$ is H.

According to an embodiment, in formula (I), each of $B_1$, $B_2$ and $B_3$ is of formula (C).

In one embodiment, in formula (B), Z is —O— and W is —C(=O)—NH—Y'—, Y' being preferably a —$CH_2$— group. In one embodiment, in formula (C), Z' is —O— and W' is —C(=O)—NH—Y'—, Y' being preferably a —$CH_2$— group.

In one embodiment, each of $B_1$, $B_2$ and $B_3$ is of formula (C) wherein Z' is O and W' is —C(=O)—NH—Y', Y' being a methylene group.

In one embodiment, W is —C(=O)—NH—Y', Y' being preferably a —$CH_2$— group.

In one embodiment, in formula (B), X is a bond or a —NH—$(CH_2)_2$— group, preferably a bond.

In one embodiment, in formula (B), Y is a —$(CH_2)_2$—, —$(CH_2)_3$— or a —$CH_2$—$CH(CH_3)$— group, preferably a —$(CH_2)_2$— group.

According to an embodiment, the precursor of the invention comprises at least one unit (U1) as defined above and at least one unit (U'1) as defined above wherein $R_b$ is H and $R_c$ is $B_3$ having the formula (C) as defined above.

According to an embodiment, the precursor of the invention has the following formula:

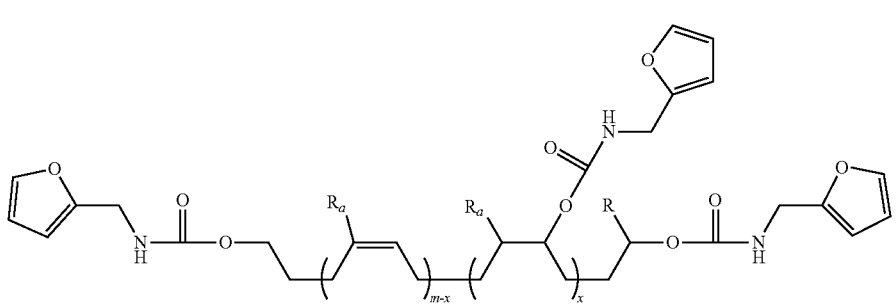

(I-1)

wherein:

$R_a$ and m are as defined above in formula (I); and x is an integer comprised between 1 and 10,000, and preferably between 50 and 1,000.

Process for the Preparation of the Precursors of General Formula (I)

The present invention also relates to a process for the preparation of a compound of formula (I) as defined above, comprising the following steps:

a) the epoxidation of an aldehyde of formula (II):

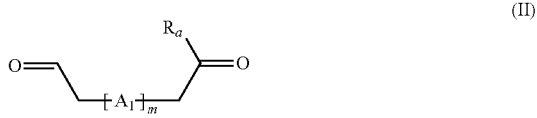

(II)

wherein:

$R_a$ and m are as defined in formula (I);

$A_1$ comprises at least one unit (U1) and optionally at least one unit (U2) as defined in formula (I);

in order to obtain a compound having the following formula (III):

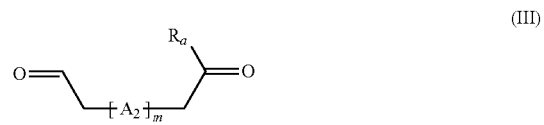

(III)

wherein:

$A_2$ comprises at least one unit (U1) as defined above and at least one unit (U3) having the following formula:

(U3)

m and $R_a$ being as defined in formula (I);

b) a reduction step of the compound of formula (III) with a reducing agent, such as sodium bis(2-ethoxyethoxy)aluminohydride, in order to obtain the following compound having the below formula (IV):

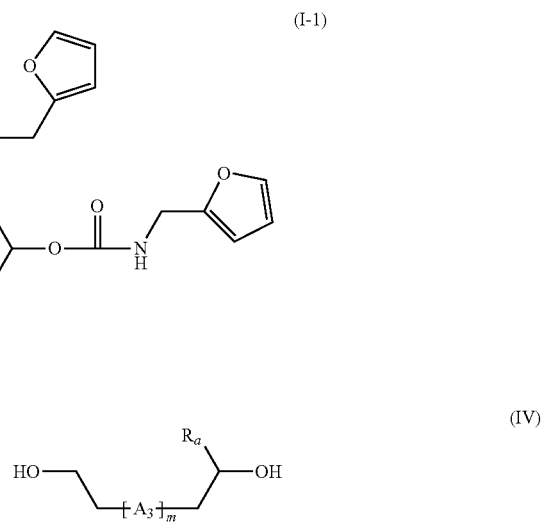

(IV)

wherein:

$A_3$ comprises at least one unit (U1) as defined above and at least one unit (U4) having the following formula:

(U4)

$R_b$ is H and $R'_c$ is OH, or $R_b$ is OH and $R'_c$ is H;

m and $R_a$ being as defined in formula (I);

c) the reaction of the compound of formula (IV) with at least one functionalized furane having the following formula (V):

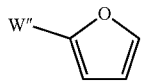

(V)

wherein W' is independently chosen from the group consisting of: —Y'—N=C=O, —Y'—C(=O)—Cl, —Y'—C(=O)—OH, —Y'—C(=O), and —Y'-Hal, Y' being as defined above and Hal being an halogen atom;

in order to obtain a compound having the formula (I).

Advantageously, the aldehyde of formula (II) according to the invention may be obtained by a degradation step of commercial polymers, in particular polymers having a high molar mass, for example comprised between 100 000 and 500 000 g·mol$^{-1}$. Among these commercial polymers, it may be cited the polybutadiene, the polyisoprene or the polychloroprene. This degradation step is well-known in the art. For example, the degradation step may be performed by an epoxidation step of said commercial polymers, followed by a cleavage of the oxirane groups, in particular by periodic acid.

The operating conditions of the above-mentioned steps a), b) and c) are known in the art.

In particular, the epoxidation (step a)) may be performed in the presence of an organic solvent such as tetrahydrofurane, dichloromethane, dichloroethane, tetrachloroethane, chloroform, toluene, diethyl ether, ethyl acetate, cyclohexane, or their mixtures; preferably tetrahydrofurane. This step may be carried out at a temperature comprised between 0° C. and 40° C., preferably between 0° C. and 5° C.

This epoxidation step is carried out by the reaction of the aldehyde of formula (II) with an epoxidation agent, such as m-CPBA, H$_2$O$_2$/Formic acid, H$_2$O$_2$/acetic acid or H$_2$O$_2$/ other acid carboxylic, in particular 3-chloroperoxybenzoic acid (mCPBA).

As defined above, the compounds of formula (III) comprise at least one epoxidized unit (U3) but they may also comprise other epoxidized units.

In particular, the reduction (step b)) may be performed in the presence of an organic solvent such as tetrahydrofurane, dichloromethane, dichloroethane, tetrachloroethane, chloroform, toluene, diethyl ether, ethyl acetate, cyclohexane, or their mixtures; preferably toluene. This step may be carried out at a temperature comprised between 25° C. and 130° C., preferably between 80° C. and 110° C.

This reduction step is carried out by the reaction of the compound of formula (III) with a reduction agent such as sodium bis(2-ethoxyethoxy)aluminohydride.

The addition of the functionalized furane (step c)) may be performed in the presence of an organic solvent such as dichloromethane, dichloroethane, tetrachloroethane, chloroform, toluene, diethyl ether, ethyl acetate, cyclohexane, or their mixtures; preferably tetrahydrofurane.

The addition of the functionalized furane (step c)) may be performed at a temperature range of −20° C. to 50° C., more particularly at a range of 25 to 35° C. In one embodiment, it is performed in the presence of a catalyst such as dibutyltindilaurate, preferably in a molar ratio of 0.1% to 10% compared to the compound VI for example in a range of 2% to 5%.

The present invention further relates to a compound having the formula (IV) as defined above. Preferably, the invention relates to a compound having the formula (IV) as defined above, wherein R$_a$ is other than H.

Polymers Obtained from the Precursors of General Formula (I)

The present invention also relates to a polymer, preferably a recyclable polymer, susceptible to be obtained by the reaction of a compound of formula (I) as defined above, with a crosslinking agent comprising at least two maleimidyl groups.

In a particular embodiment, the ratio cross-linking agent/ precursors of formula (I) is comprised between 0.1 and 1, preferentially between 0.3 and 1.

In one embodiment, the crosslinking agent has the following formula (VII):

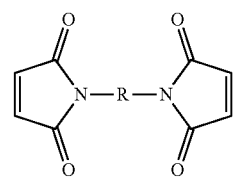

(VII)

wherein R is chosen from the group consisting of:

a linear or branched (C$_1$-C$_{20}$)alkylene, said alkylene being optionally interrupted by one or more heteroatom(s), such as O or S;

a phenylene, said phenylene being optionally substituted by one or more substituent(s) selected from (C$_1$-C$_{10}$) alkyl, preferably by one or more methyl group(s); and a phenylene-L-phenylene group, with L being selected from the group consisting of: a bond, a (C$_1$-C$_6$)alkylene, —O— and —SO$_2$—.

In a particular embodiment, the crosslinking agent is selected from the group consisting of: 1,1'-(methylenedi-4, 1-phenylene)bismaleimide, N,N'-(4-methyl-1,3-phenylene) bismaleimide, 1,1'-(3,3'-dimethyl-1,1'-bisphenyl-4,4'diyl) bismaleimide, N, N',-(1,3-phenylene)bismaleimide, N,N',-(1,4-phenylene)bismaleimide, N,N'-(1,2-phenylene) bismaleimide, dithio-bis-maleimidoethane, 1,11-bismaleimido-triethyleneglycol, 4,4'-oxybis (methylbenzene)bismaleimide.

Preferably, said crosslinking agent is the 1,1'-(methylenedi-4,1-phenylene)bismaleimide, having the following formula:

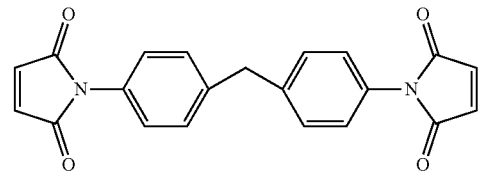 [SMILES: O=C1C=CC(=O)N1c1ccc(Cc2ccc(N3C(=O)C=CC3=O)cc2)cc1]

According to an embodiment, the crosslinking agent has the following formula (VIII):

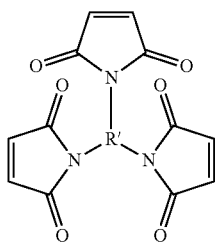

(VIII)

wherein R' is chosen from the group consisting of: a trivalent ($C_1$-$C_{10}$)alkane, or a trivalent ($C_6$-$C_{10}$) arene, preferably a trivalent methane or a trivalent benzene.

The present invention also relates to a process of preparation of a polymer comprising the reaction of a compound of formula (I) as defined above, with a crosslinking agent comprising at least two maleimidyl groups as defined above. The invention relates to a polymer obtained by said process of preparation. The invention relates to the use of the compound of formula (I), for the preparation of a polymer.

In particular, the polymers of the invention are elastomers, preferably recyclable elastomers. Indeed, said elastomers can undergo from 1 to 5 remolding cycles without any loss of their mechanical properties.

The present invention thus also relates to the use of a compound of formula (I) as defined above, for the preparation of an elastomer, preferably a recyclable elastomer.

The remolding step can be performed by the dissolution of said elastomer in an organic solvent such as chloroform, dichloroethane, tetrachloroethane, toluene, tetrahydrofurane, preferably chloroform. In one embodiment, said remolding step is performed at a temperature comprised between 100° C. and 150° C., for example comprised between 110° C. and 130° C., such as 120° C.

The invention also relates to the use of the polymers and/or elastomers as defined above in tires, rubber seals, automotives, aerospace systems, anti-vibration systems, and buildings. In particular embodiment, said polymers and/or elastomers as defined above may be used in a temperature range comprised between −95° C. and +130° C., preferably between −45° C. and +110° C.

BRIEF DESCRIPTION OF THE DRAWINGS

FIG. 2a: elastic modulus E'; and FIG. 2b: Tan δ.

FIG. 3a: elastic modulus E'; and FIG. 3b: Tan δ.

FIG. 4a: PI networks; FIG. 4b: PB networks; FIG. 4c: zoom between 10 and 70° C. for PI networks; and FIG. 4d: zoom between 10 and 70° C. for PB networks.

In FIG. 4a and FIG. 4c, the curve 'a' concerns Net-PI-0.30 eq, the curve 'b' concerns Net-PI-0.50 eq, the curve 'c' concerns Net-PI-0.75 eq, and the curve 'd' concerns Net-PI-1.00 eq.

In FIG. 4b and FIG. 4d, the curve 'a' concerns Net-PB-0.30 eq, the curve 'b' concerns Net-PB-0.50 eq, the curve 'c' concerns Net-PB-0.75 eq, and the curve 'd' concerns Net-PB-1.00 eq.

In FIG. 5a, the curve 'a' represents the strain at break (%), the curve 'b' represents the Young's modulus (MPa) and the curve 'c' represents the stress at break (MPa). In FIG. 5b, the Elastic modulus E' obtained by DMA.

EXAMPLES

Example 1: Preparation of Precursors of Formula (I) According to the Invention

Figure 6:
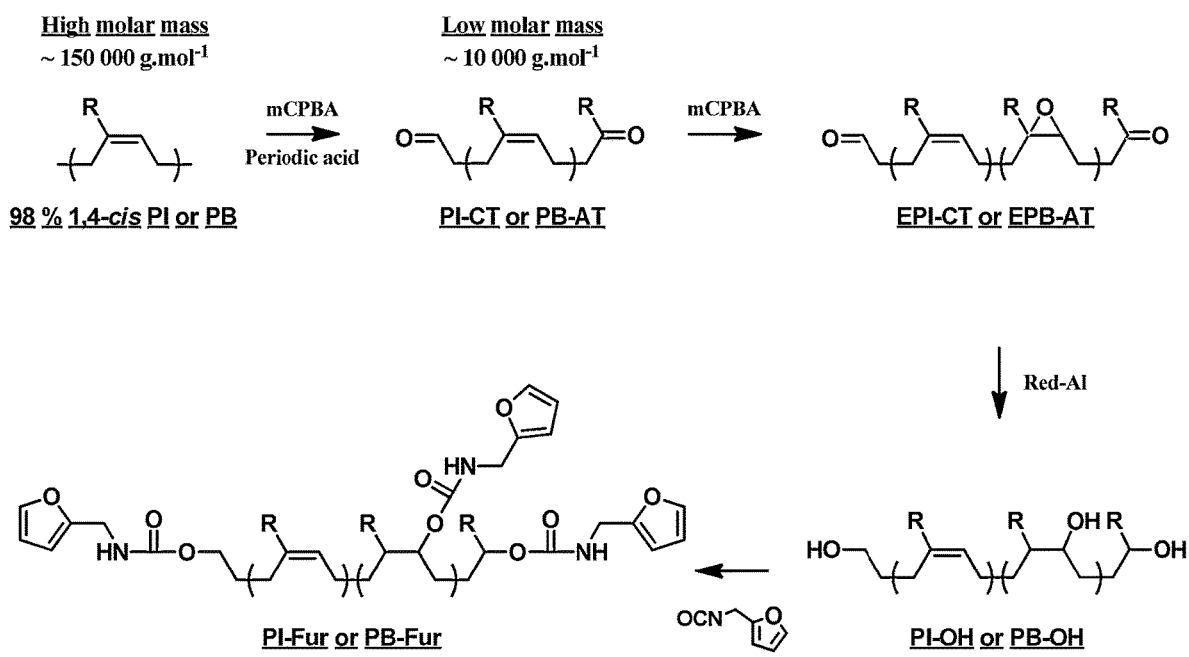
FIG. 6: Reaction scheme 1: General synthetic route used for the synthesis of 1,4-cis low molar mass PI-Fur and PB-Fur.

Low molar mass polyisoprene (PI) and polybutadiene (PB) with a 1,4-cis units content over 98% containing furan group along the backbone and at both chain-ends (PI-Fur and PB-Fur) were prepared starting from high molar mass 1,4-cis PI and PB according to the scheme shown in FIG. 6:

Polyisoprene carbonyl telechelic (PI-CT) and polybutadiene aldehyde telechelic (PB-AT) with a molar mass of 10 000 g·mol$^{-1}$ were first prepared by a controlled degradation of the PI and PB (epoxidation with mCPBA followed by cleavage of the oxirane rings by periodic acid) (Q. Zhou, S. Jie, B.-G. Li, *Polymer* 2015, 67, 208; and A. Saetung, A. Rungvichaniwat, I. Campistron, P. Klinpituksa, A. Laguerre, P. Phinyocheep, J.-F. Pilard, *J. Appl. Polym. Sci.* 2010, 117, 1279). Then, around 10% of the repeating units of PI-CT and PI-AT were epoxidized with mCBPA to yield epoxidized polyisoprene carbonyl telechelic (EPI-CT) and epoxidized polybutadiene aldehyde telechelic (EPI-AT). The epoxy units and terminal carbonyl groups were finally simultaneously reduced by sodium dihydrobis-(2-methoxyethoxy) aluminate (Red-Al) to obtain the polyisoprene and polybutadiene with hydroxyl groups at the chain-end and along the backbone (PI-OH and PB-OH, Scheme), a method recently described for epoxidized polybutadiene (Q. Zhou, A. Wang, L. Dai, S. Jie, B.-G. Li, *Polymer* 2016, 107, 306). Finally, furan-isocyanate was reacted with the hydroxyl group to lead to the formation of PI and PB with furan group along the backbone and at both chain-ends (PI-Fur and PB-Fur). All intermediates were characterized by SEC and $^1$H NMR, confirming the absence of side reactions. For instance, SEC chromatograms of the different intermediates are perfectly superimposed showing the absence of uncontrolled cross-linking that could have occurred during the modifications steps.

1. Materials

Cis-1,4-polybutadiene (98% cis-1,4, $M_n$=150 kg·mol$^{-1}$. Đ=2.8) and cis-1,4-polyisoprene (98% cis-1,4, $M_n$=635 kg·mol$^{-1}$. Đ=2.1) were purchased from Scientific Polymer Products, Inc. 3-Chloroperoxybenzoic acid (mCPBA, 70-75%, Acros), periodic acid ($H_5IO_6$, ≥99%, Aldrich), acetic acid (99%, Aldrich), bis(2-methoxyéthoxy)aluminohydrure de sodium (Red-Al®) (60 wt. % in toluene, Aldrich), sodium triacetoxyborohydride (NaBH(OAc)$_3$, 97%, Aldrich), diethanolamine (DEA, 99%, Alfa Aesar), furfuryl isocyanate (Furan-NCO, 97%, Aldrich), 1,1'-(methylenedi-4,1-phenylene)bismaleimide (Bismaleimide, 95%, Alfa Aesar), celite 545 (VWR), dibutyltin dilaurate (DBTDL, 95%, TCI) were used without further purification. Tetrahydrofuran (THF) and dichloromethane (DCM) were dried on alumina column. Chloroform (CHCl$_3$), methanol and diethyl ether (reagent grade, Aldrich) were used as received.

2. Preparation of Precursors from Polyisoprene (PI-Fur)

PI-CT synthesis. High molar mass cis-1,4-polyisoprene (4.28 g), solubilized in 150 mL of THF, was first epoxidized by a dropwise addition at 0° C. of a mCPBA solution (0.805 mmol in 10 ml THF). After 2 h of reaction at room temperature, periodic acid (1.05 eq. compared to mCPBA, 0.846 mmol), dissolved in 10 mL of THF, was added dropwise and stirred during 2 h at room temperature. The solvent was then removed under reduced pressure and the crude product was dissolved in diethyl ether before filtration on celite to remove insoluble iodic acid. The filtrate was then concentrated before washing 2 times with saturated solution (30 mL of each) of Na$_2$S$_2$O$_3$, NaHCO$_3$ and distilled water. Finally, the organic layer was dried (MgSO$_4$), filtered on celite and the solvent was evaporated under vacuum to obtain PI-CT $M_{n\ (NMR)}$=9 000 g·mol$^{-1}$, $M_{n\ (SEC)}$=11 400 g·mol$^{-1}$, Đ=1.4. Yield=94%. $^1$H NMR (400 MHz, CDCl$_3$): (δ, ppm) 9.77 (t, 1H, —CH$_2$—CHO), 5.12 (s, nH, —CH$_2$—C(CH$_3$)=CH—CH$_2$—), 2.49 (t, 2H, —CH$_2$—CHO), 2.44 (t, 2H, —CH$_2$—CH$_2$—C=O(CH$_3$)), 2.34 (t, 2H, —CH$_2$—CH$_2$—CHO), 2.27 (t, 2H, —CH$_2$—CH$_2$—C=O(CH$_3$)), 2.12 (s, 3H, —CH$_2$—CH$_2$—C=O(CH$_3$)), 2.04 (s, 4 nH, —CH$_2$—C(CH$_3$)=CH—CH$_2$—), 1.68 (s, 3 nH, —CH$_2$—C(CH$_3$)=CH—CH$_2$—) with n=130.

EPI-CT synthesis. PI-CT (4.2 g, 61.76 mmol PI units) solubilized in 150 mL of THF was partially epoxidized by a dropwise addition at 0° C. of a mCPBA solution (6.17 mmol in ml THF, 10 mol-% compared to isoprene units). After 2 h of reaction at room temperature, the solution was concentrated before being washed 3 times by precipitation/dissolution in methanol/DCM and the solvent was evaporated under vacuum to obtain EPI-CT. The epoxy percentage was determined by $^1$H NMR with the formula Epoxy (%)=[/(2.69)//(2.69+5.12)]×100, Epoxy content=10.0%, yield: 95%. $^1$H NMR (400 MHz, CDCl$_3$): (δ, ppm) 5.12 (s, n-mH, —CH$_2$—C(CH$_3$)=CH—CH$_2$—), 2.68 (t, mH, —CH-epoxy-CH$_3$—), 2.04 (s, 4n-mH, —CH$_2$—C(CH$_3$)=CH—CH$_2$—), 1.68 (s, 3n-mH, —CH$_2$—C(CH$_3$)=CH—CH$_2$—), 1.28 (s, 3 mH, —CH-epoxy-CH$_3$—) with n=117 and m=13

PI-OH synthesis. EPI-CT (4.20 g, 6.18 mmol oxirane units) solubilized in 84 mL of dry toluene was oxidized by addition at room temperature of a Red-Al solution (6 eq compared to oxirane units, 12.5 ml). After stirring at 110° C. during 16 h, 30 mL of toluene was added and the residual Red-Al was deactivated at 0° C. by a dropwise addition of ethanol and water. The solution was then dried with MgSO$_4$ before filtration onto Celite. The organic solvent was then evaporated under vacuum to obtain PI-OH. Yield=92%. $^1$H NMR (400 MHz, CDCl$_3$): (δ, ppm) 5.38 (m, 2n-mH, —CH$_2$—CH=CH—CH$_2$—), 2.92 (t, 2 mH, —CH-epoxy-CH—), 2.08 (s, 4n-mH, —CH$_2$—CH=CH—CH$_2$—) with n=117 and m=13

PI-Fur synthesis. PI-OH (3.88 g, 5.71 mmol PI-OH units) was solubilized in 25 mL of dry THF. 1.2 eq of furan-NCO (732 μl, 6.85 mmol) and 5 mol-% of DBTDL (168 μl, 285 μmol) were added to the solution and stirred at 40° C. during 6 h under inert atmosphere. After partial evaporation of the solvent, the product was purified by precipitation/dissolution in methanol/DCM several times and dried in vacuum to obtain a brown liquid PI-Fur. Yield=92%. $^1$H $^1$H NMR (400 MHz, CDCl$_3$): (δ 5.38 (m, 2(n−m)H, —CH$_2$—CH=CH—CH$_2$—), 2.92 (t, 2 mH, —CH-epoxy-CH—), 2.08 (s, 4(n−m)H, —CH$_2$—CH=CH—CH$_2$—) with n=117 and m=13.

3. Preparation of Precursors from Polybutadiene (PB-Fur)

PB-AT synthesis. High molar mass cis-1,4-polybutadiene (3.09 g) solubilized in 110 mL of THF was first epoxidized by a dropwise addition at 0° C. of a mCPBA solution (0.589 mmol in 10 mLTHF). After 2 h of reaction at room temperature, periodic acid (1.05 eq. compared to mCPBA, 0.619 mmol) dissolved in 10 mL of THF was added dropwise and stirred during 2 h at room temperature. The solvent was then removed under reduced pressure and the crude product was dissolved in diethyl ether before filtration on celite to remove insoluble iodic acid. The filtrate was then concentrated before washing 2 times with saturated solution (30 mL of each) of Na$_2$S$_2$O$_3$, NaHCO$_3$ and distilled water. Finally, the organic layer was dried (MgSO$_4$), filtered on celite and the solvent was evaporated under vacuum to obtain PB-AT. $M_{n\ (NMR)}$=10 250 g·mol$^{-1}$, $M_{n\ (SEC)}$=12 400 g·mol$^{-1}$, Đ=1.7, yield: 94%. $^1$H NMR (400 MHz, CDCl$_3$): (δ, ppm) 9.77 (t, 2H, —CH$_2$—CHO), 5.38 (m, 2 nH, —CH$_2$—CH=CH—CH$_2$—), 2.49 (t, 4H, —CH$_2$—CH$_2$—CHO), 2.38 (t, 4H, —CH$_2$—CH$_2$—CHO), 2.09 (s, 4 nH, —CH$_2$—CH=CH—CH$_2$—) with n=187

EPB-AT synthesis. PB-AT (2.83 g, 52.41 mmol PB units) solubilized in 100 mL of THF was epoxidized by a dropwise addition at 0° C. of a mCPBA solution (5.76 mmol in 10 mL THF). After 2 h of reaction at room temperature, the solution was concentrated before being washed 3 times by precipitation/dissolution in methanol/DCM and the solvent was evaporated under vacuum to obtain EPB-AT. The epoxy percentage was determined by $^1$H NMR with the formula Epoxy (%)=[/(2.79)//(2.79+5.24)]×100, Epoxy content=11.2%, yield: 93%. $^1$H NMR (400 MHz, CDCl$_3$)): (δ, ppm) 9.77 (t, 2H, —CH$_2$—CHO), 5.38 (m, 2(n−m)H, —CH$_2$—CH=CH—CH$_2$—), 2.92 (t, 2 mH, —CH-epoxy-CH—), 2.49 (t, 4H, —CH$_2$—CH$_2$—CHO), 2.38 (t, 4H, —CH$_2$—CH$_2$—CHO), 2.22 (m, 2 mH, —CH$_2$—CH-epoxy-CH—CH$_2$—), 2.08 (s, 4(n−m)H, —CH$_2$—CH=CH—CH$_2$—) with n=187 and m=21.

PB-OH synthesis. PB-AT (2.70 g, 5.00 mmol of oxirane units) solubilized in 30 mL of dry toluene was oxidized by addition at room temperature of a Red-Al solution (6 eq compared to oxirane units, 10.1 ml). After stirring at 110° C. during 16 h, 30 mL of toluene was added and the residual Red-Al was deactivated at 0° C. by a dropwise addition of ethanol and water. The solution was then dried with MgSO$_4$ before filtration onto Celite. The organic solvent was then evaporated under vacuum to obtain PB-OH. Yield=83%. $^1$H NMR (400 MHz, CDCl$_3$): (δ, ppm) 5.38 (m, 2(n−m)H, —CH$_2$—CH=CH—CH$_2$—), 3.64 (t, 4H, —CH$_2$—OH), 3.60 (m, mH, —CH(OH)— (t, 2 mH, —CH-epoxy-CH—), 2.08 (s, 4(n−m)H, —CH$_2$—CH=CH—CH$_2$—) with n=187 and m=21.

PB-Fur synthesis. PB-OH (2.14 g, 4.36 mmol PB-OH units) was solubilized in 14 mL of dry THF. 1.2 eq of furan-NCO (560 μl, 5.23 mmol) and 5 mol-% of DBTDL (128 μl, 218 μmol) were added to the solution and stirred at 40° C. during 6 h under inert atmosphere. After concentration, the product was purified by precipitation/dissolution in methanol/DCM several times and dried under vacuum to obtain a brown liquid PB-Fur. Yield=92%. $^1$H NMR (400 MHz, CDCl$_3$): (δ, ppm) 7.34 (m, 2H, —CH=CH—O—furan), 6.30 (m, 2H, —CH=CH—O— furan), 6.20 (m, 2H, C=CH—CH=CH—O— furan), 5.38 (m, 2(n−m)H, —CH$_2$—CH=CH—CH$_2$—), 4.78 (s, mH, —CH (urethane) along the chain, 4.33 (s, (2m+4)H, —NH—CH$_2$—Furan 4.08 (t, 4H, —CH$_2$-urethane chain-ends), 2.08 (s, 4(n–m)H, —CH$_2$—CH═CH—CH$_2$—) with n=187 and m=21.

4. Characterization

Liquid-state $^1$H and $^{13}$C NMR spectra were recorded at 298 K on a Bruker Avance 400 spectrometer operating at 400 MHz and 100 MHz respectively in appropriate deuterated solvents. Polymer molar masses were determined by size exclusion chromatography (SEC) using tetrahydrofuran (THF) as the eluent (THF with 250 ppm of Butylated hydroxytoluene as inhibitor, Aldrich) at 40° C. The SEC line was equipped with a Waters pump, a Waters RI detector and a Wyatt Light Scattering detector. The separation was achieved on three Tosoh TSK gel columns (300×7.8 mm) G5000 HXL, G6000 HXL and a Multipore HXL with exclusion limits from 500 to 40 000 000 g/mol, at flow rate of 1 mL/min. The injected volume is 100 µL. Molar masses were evaluated with polyisoprene standards calibration. Data were processed with Astra software from Wyatt.

Differential scanning calorimetry (DSC) measurements of rubber samples (≈10 mg) were performed using a DSC Q100 LN$_2$ apparatus from TA Instruments with a heating and cooling ramp of 10° C.·min$^{-1}$. The samples were first heated from 25° C. to 80° C. and held at 80° C. for 10 min in order to eliminate the residual solvent, then cooled to –150° C. and finally heated to 200° C. The analyses were carried out in a helium atmosphere with aluminum pans. Thermo-gravimetric measurements (TGA) of polybutadiene samples (≈12 mg) were performed on a TA Instruments Q500 from room temperature to 600° C. with a heating rate of 10° C.·min$^{-1}$. The analyses were investigated under nitrogen atmosphere with platinum pans. A TA Instrument RSA3 was used to study dynamic mechanical properties of rubber samples. They were analyzed under air atmosphere from –105° C. to 200° C. at a heating rate of 4° C.·min$^{-1}$. The measurements were performed in tensile mode at a frequency of 1 Hz and an initial static force of 0.1 N.

$^1$H NMR spectra of the PB intermediates are represented on FIG. 1a-1d. The signal at 9.77 ppm (peak 1, FIG. 1a) corresponding to the aldehyde protons of the PB-AT chain-ends allowed to evaluate the polymerization degree of polymerization (DP=187) of the chain after degradation. For EPB-AT, a new signal for the epoxy units proton appeared at 2.92 ppm allowing to calculate the amount of epoxy units (peak 6, FIG. 1b), the calculating epoxy content is equal to 11% that is to say 20.6 epoxy units per chains. After oxidation of the oxirane rings to yield PI-OH, this latter signal disappeared completely and two new signals appeared around 3.55-3.70 ppm (peak 1+6, FIG. 1c), a multiplet at 3.60 ppm corresponding to the proton signal of the methyl linked to the hydroxyl groups —CH(OH)— along the PB chain, a second one associated to the methyl proton of the hydroxyl chain end (—CH$_2$—OH). Integral of these signals (23.4H) associated to the complete disappearance of the epoxy units allow confirming the completeness of the reduction reaction (24.6H theoretical). Finally, after reaction with furan-isocyanate, it was possible to assume a full conversion of all the hydroxyl groups thanks to the presence of news peaks (peaks 9, 10 and 11 at 6.20, 6.30 and 7.34 ppm respectively, FIG. 1d) corresponding to the furan protons. Moreover, the shift of the peak 1, FIG. 1d from 3.65 ppm to 4.10 ppm confirmed that the hydroxyl groups present at the chain ends also reacted. $^1$H NMR characterization of the PI series also allowed to show a full conversion for all steps.

DSC analyses confirmed the backbone modification through a shift of the T$_g$ with the type of modification. For the PI, T$_g$ went from –64° C. for the PI-AT to –48° C. for the PI-Fur. Similarly, T$_g$ went from –104° C. for the PB-AT to –84° C. for the PB-Fur (as shown in below Table 1). Besides, PB-AT was able to crystallize at –53° C., but after modification, crystallization was no more observed.

TABLE 1

DSC analyses of PI and PB intermediates.

| Samples | T$_{g1}$ (° C.) | T$_c$ (° C.) | T$_f$ (° C.) |
|---|---|---|---|
| PI-AT | −63.9 | / | / |
| EPI-AT | −55.8 | / | / |
| PI-OH | −50.8 | / | / |
| PI-Fur | −47.6 | / | / |
| PB-AT | −104.4 | −53 | −13 |
| EPB-AT | −93.8 | / | / |
| PB-OH | −89.5 | / | / |
| PB-Fur | −84.3 | / | / |

Example 2: Preparation of the Network Films

Network of PI and PB were obtained by mixing the dissolved PI/PB-Fur in chloroform with the adequate quantity of bis-maleimide dissolved in chloroform. The mixture was heated at 60° C. for 10 min in closed glassware and deposited in a Teflon mold. Solvent was then let evaporated for 24 h and complete drying was obtained under vacuum for an extra 24 h to obtain a transparent film without air bubbles. For example, the Net-PI-1.00 eq was obtained by mixing 818 mg of PI-Fur in 1 mL of chloroform with 219 mg of bismaleimide in 1 mL of chloroform.

Figure 7:
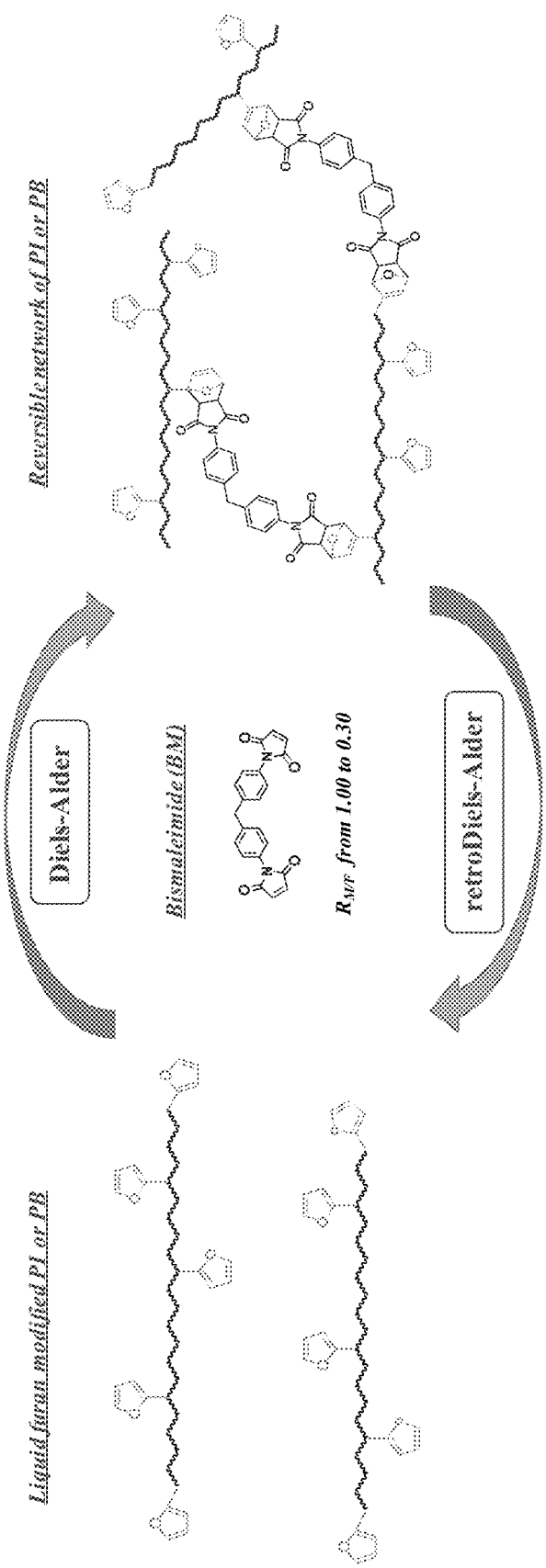
FIG. 7: Schematic showing thermo-reversible PI-Fur or PB-Fur networks based on the Diels-Alder reactions.

As shown in FIG. 7, PI-Fur or PB-Fur were then mixed with the bis-maleimide in order to obtain a thermo-reversible network based on the Diels-Alder reaction. To tune the properties of these elastomeric materials, the amount of bis-maleimide was varied from 1.00 to 0.30 eq compared to the furan groups (R$_{MF}$=[maleimide]/[furan]).

Example 3: Swelling Tests of the Network Films

Dried samples (initial mass, m$_i$, approximately 40 mg) were placed into chloroform at room temperature for 24 h. Chloroform was changed and samples were placed again for 48 h at room temperature. Swollen samples were weighted (swollen mass, m$_s$) and dried under vacuum until constant mass (dry mass, m$_d$). Each sample was analyzed in triplicates. Swelling degree and the soluble fraction were determined by Eqs. 1 and 2 respectively.

Swelling degree=(m$_s$−m$_d$)/m$_d$×100(%)    (equation. 1)

Soluble fraction=(m$_i$−m$_d$)/m$_d$×100(%)    (equation. 2)

Swelling tests were first performed in order to evaluate the efficiency of the cross-linking of the chains. The soluble fraction was always relatively low (less than 6%) even for the lowest cross-linked material (R$_{M/F}$=0.30, and Table 2 below).

For the PI networks, the soluble fraction decreased from 5.6% to 0.3% when R$_{M/F}$ increased from 0.30 to 1.00. The soluble fraction was even lower for the PB networks. On another hand, the swelling degree decreased from 850% to 400% for PI networks and from 570 to 280% for PB networks when RMF increased from 0.30 to 1.00. Cross-linking reactions were very efficient.

TABLE 2

Swelling properties of the of PI and PB networks as a function of $R_{M/F}$.

| Samples | Swelling degree (%) | Soluble fraction (%) |
|---|---|---|
| Net-PI-0.30eq | 843 ± 10 | 5.6 ± 0.5 |
| Net-PI-0.50eq | 522 ± 3 | 1.8 ± 0.8 |
| Net-PI-0.75eq | 380 ± 26 | 0.6 ± 0.7 |
| Net-PI-1.00eq | 398 ± 31 | 0.3 ± 0.3 |
| Net-PB-0.30eq | 571 ± 21 | 4.4 ± 1.1 |
| Net-PB-0.50eq | 403 ± 7 | 1.2 ± 0.8 |
| Net-PB-0.75eq | 297 ± 10 | 1.0 ± 0.5 |
| Net-PB-1.00eq | 275 ± 30 | 1.1 ± 0.4 |

Example 4: Mechanical Properties of the Network Films

All the strips used for DMA and tensile tests analyses were put into a hermetic closed glassware (1 g in 1.5 mL of CHCl$_3$) and heated at 125° C. for 10 minutes. After 5 minutes at room temperature, the liquid solution is deposited in a Teflon mold before waiting 24 h for solvent evaporation and an extra 24 h under vacuum to obtain a transparent film without air bubbles.

1. Tensile Test Analyses

Mechanical properties of the networks were first analyzed by tensile test analyses. Results are summarized on Table 3.

TABLE 3

Mechanical properties of the networks characterized by tensile analyses and DMA for the first and second cycle of molding as a function of RM/F.

| Samples | Cycle | Young modulus (MPa) | Stress at break (MPa) | Strain at break (%) |
|---|---|---|---|---|
| Net-PI-0.30eq | First | 0.9 ± 0.0 | 0.8 ± 0.0 | 158 ± 17 |
| | Second | 1.1 ± 0.1 | 1.2 ± 0.2 | 186 ± 18 |
| Net-PI-0.50eq | First | 4.1 ± 0.3 | 3.3 ± 0.3 | 152 ± 17 |
| | Second | 4.9 ± 0.1 | 2.2 ± 0.3 | 140 ± 12 |
| Net-PI-0.75eq | First | 26.7 ± 2.4 | 8.0 ± 0.9 | 124 ± 17 |
| | Second | 22.4 ± 2.6 | 7.2 ± 0.4 | 116 ± 13 |
| Net-PI-1.00eq | First | 61.1 ± 6.9 | 11.3 ± 2.8 | 118 ± 11 |
| | Second | 56.9 ± 9.2 | 9.5 ± 0.9 | 102 ± 15 |
| Net-PB-0.30eq | First | 3.2 ± 0.3 | 1.6 ± 0.1 | 83 ± 4 |
| | Second | 2.8 ± 0.1 | 1.8 ± 0.1 | 112 ± 5 |
| Net-PB-0.50eq | First | 7.3 ± 0.3 | 3.9 ± 0.7 | 92 ± 20 |
| | Second | 6.8 ± 0.6 | 3.7 ± 0.3 | 95 ± 16 |
| Net-PB-0.75eq | First | 46.0 ± 5.8 | 11.6 ± 0.8 | 115 ± 15 |
| | Second | 41.5 ± 2.9 | 10.3 ± 0.6 | 95 ± 15 |
| Net-PB-1.00eq | First | 235.2 ± 6.3 | 16.7 ± 1.1 | 101 ± 20 |
| | Second | 249.0 ± 15.0 | 19.8 ± 1.5 | 105 ± 18 |

| Samples | Cycle | Elastic modulus (20° C., MPa) | Elastic modulus (70° C., MPa) | Elastic modulus (90° C., MPa) |
|---|---|---|---|---|
| Net-PI-0.30eq | First | 1.1 | 0.9 | 0.6 |
| | Second | 1.4 | 1.1 | 0.7 |
| Net-PI-0.50eq | First | 8.0 | 3.4 | 2.0 |
| | Second | 8.8 | 3.3 | 2.0 |
| Net-PI-0.75eq | First | 32.9 | 5.7 | 3.0 |
| | Second | 28.1 | 5.5 | 2.9 |
| Net-PI-1.00eq | First | 69.3 | 5.2 | 2.9 |
| | Second | 76.6 | 6.3 | 3.1 |
| Net-PB-0.30eq | First | 3.6 | 3.2 | 2.6 |
| | Second | 3.3 | 2.9 | 2.4 |
| Net-PB-0.50eq | First | 9.7 | 5.6 | 4.6 |
| | Second | 7.3 | 4.6 | 3.9 |
| Net-PB-0.75eq | First | 87.3 | 11.9 | 7.5 |
| | Second | 62.7 | 11.1 | 7.3 |
| Net-PB-1.00eq | First | 320 | 123 | 7.1 |
| | Second | 258 | 129 | 7.4 |

The Young modulus increased with the molar ratio maleimide/furan, from 1 MPa for $R_{M/F}$=0.30 up to 60 MPa or 240 MPa for $R_{M/F}$=1.00 for PI and PB networks respectively. A similar behavior was observed for the stress at break, which increased with $R_{M/F}$, from 1 MPa for $R_{M/F}$=0.30 up to 10 and 16 MPa for $R_{M/F}$=1.00 for PI and PB networks respectively. This could be easily explained as an increase of $R_{M/F}$ would increase the cross-linking density and thus the strength of the network. Therefore, whatever the $R_{M/F}$, PB networks exhibited a higher value of the Young modulus and the stress at break than the PI networks. Since the two polymers have the same molar mass (~10 000 g·mol$^{-1}$) and furan modification rate (10%), this phenomenon can be attributed to the chemical structural difference between the PI and the PB. Surprisingly, the strain at break was not really affected by $R_{M/F}$. Indeed for the PI, the elongation at break went from 170% for $R_{M/F}$=0.30 to 110% for $R_{M/F}$=1.00. Tendency for the PB is similar than for the PI, whatever the quantity of bismaleimide the strain at break oscillate between 90 and 110% (Table 3).

2. Recyclability

The recyclability of these networks was then investigated. To this end, used strips were remolded after being heated in chloroform at 120° C. to induce the retro Diels-Alder reaction. Recycled strips were analyzed. Results are shown in Table 3. In all of cases, the recycled material exhibited the same properties than the one obtained for the first molding, without change for Young modulus or strain and elongation at break. This indicated the good recycling ability of the materials.

Figure 1:
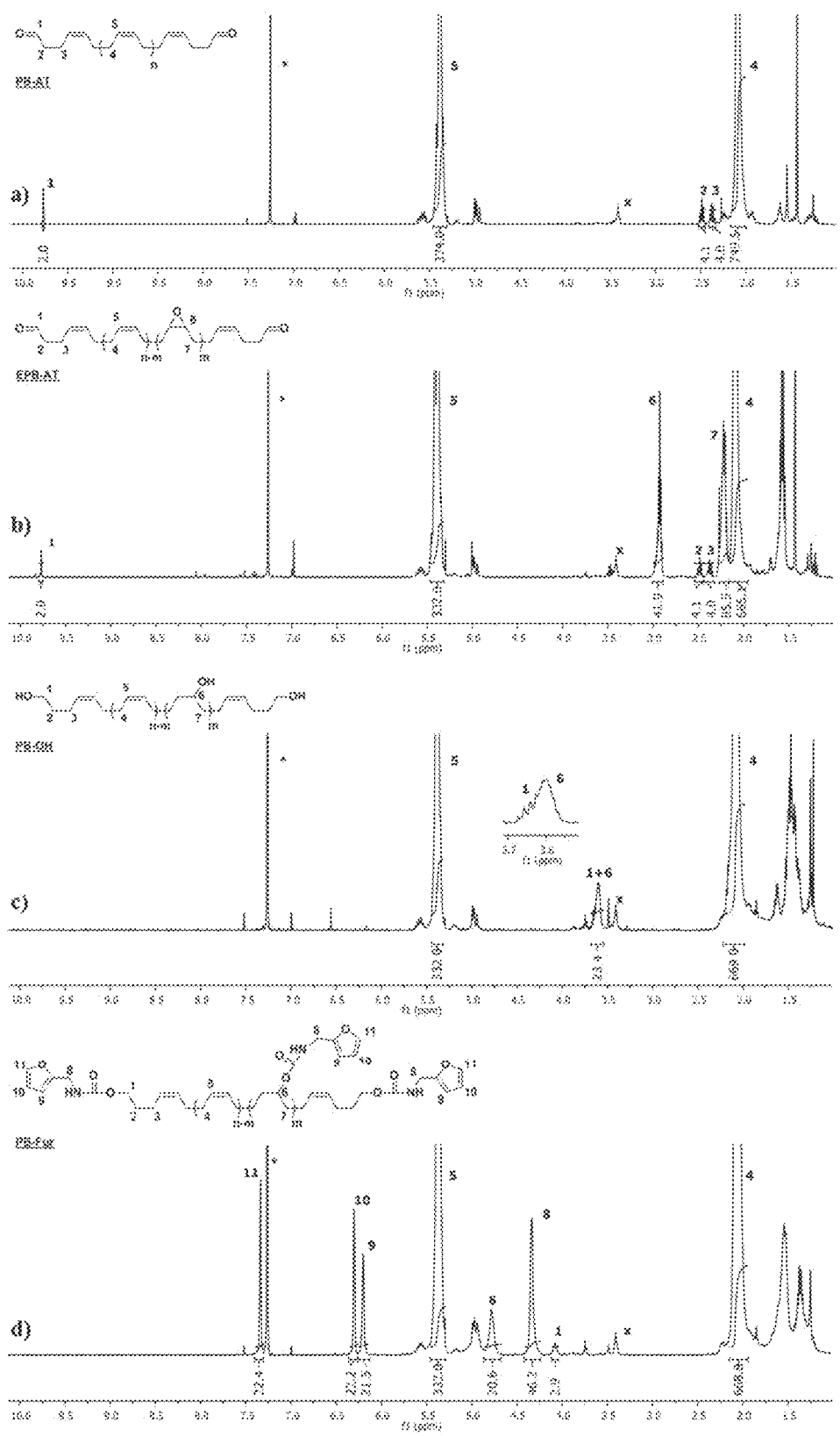
FIG. 1a-1d $^1$H NMR characterization of the PB intermediates during the synthetic route of PB-Fur.
Figure 2:
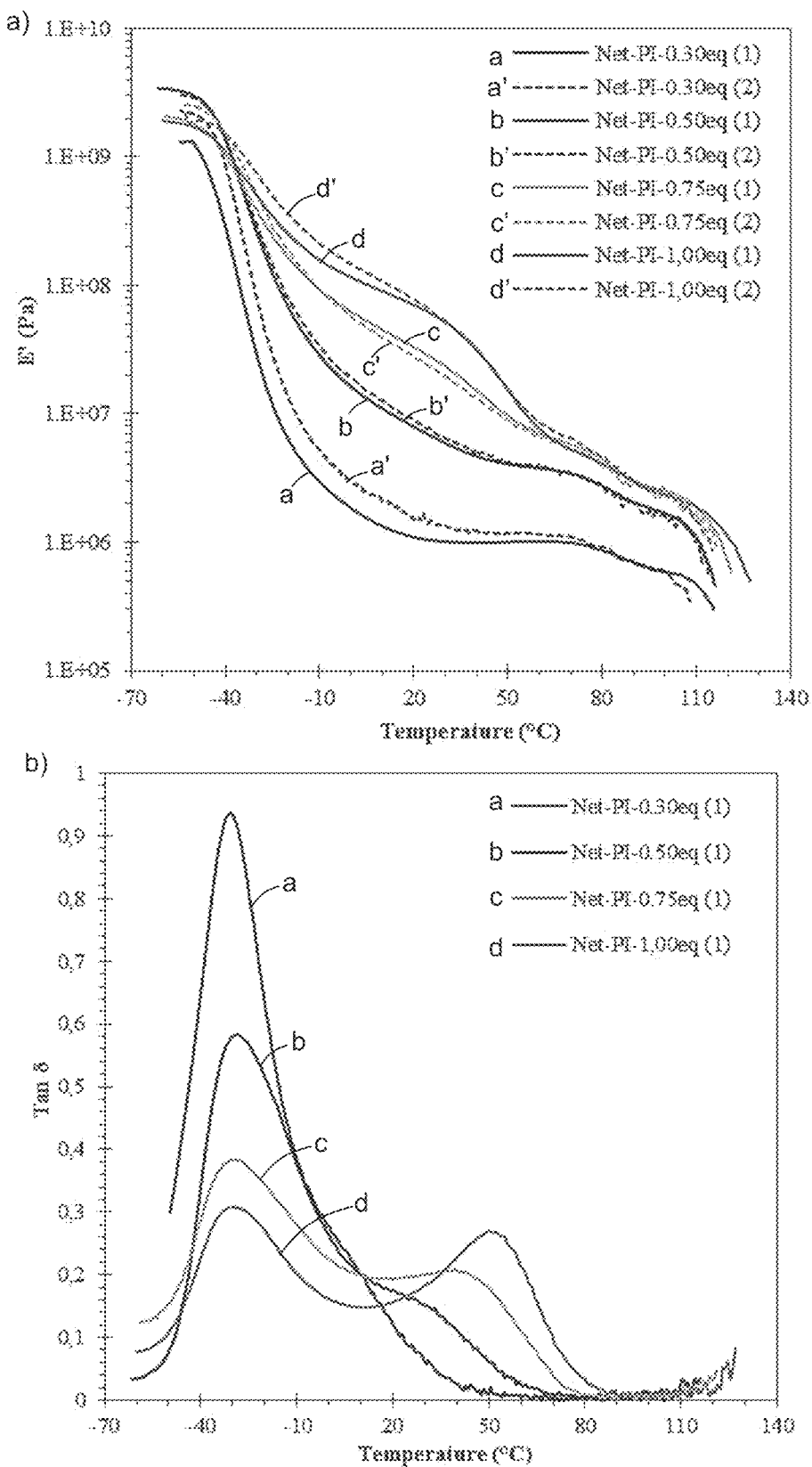
FIG. 2a-2b DMA analyses of the network of PI as a function of $R_{M/F}$.

To go further, DMA analyses were realized. For the PI networks, results are presented on FIG. 2a and FIG. 2b. Whatever the $R_{M/F}$, a $T_g$ around −30° C. was observed. On the contrary, the elastic modulus was dramatically affected by the quantity of BM. Indeed, with $R_{M/F}$=0.30, two rubbery plateau seemed to be present: a first one between −10° C. and 75° C. with a value of E' close to 1 MPa and a second one between 80 and 105° C. with an elastic modulus of 0.6 MPa (FIG. 2a, curve a). Due to rDA reaction, the material flowed above 110-120° C. The first drop of the modulus could be explained by the occurrence of the rDA reaction of the chain-ends whereas the adducts linked to the backbone seemed to be more stable, probably because of a different environment.

When $R_{M/F}$ was increased to 0.50 (FIG. 2a, curve b), the two rubbery plateau were again present (3.4 and 2.0 MPa for the first and second plateau respectively). This modulus increase can easily be explained by the higher cross-linking density as observed for the tensile tests analyses. A further increase of $R_{M/F}$ to 0.75 gave higher values of the elastic plateau localized below 75° C. and above 80° C. of 5.7 MPa and 3.0 MPa respectively, whereas for $R_{M/F}$=1.00, no further increase of the moduli values was observed. Most likely, at $R_{M/F}$=0.75, for 10 mol-% of furan group along the chain, the maximum cross-linking density was almost achieved as it is unlikely that all of the maleimide groups could react with the furan groups at $R_{M/F}$=1.00. Some BM should be linked only by one of its maleimide group.

More surprisingly, a third plateau appeared between −10° C. and 40° C. when $R_{M/F}$ is equal to 0.75 or 1.00 with an increase from 30 MPa to 75 MPa when $R_{M/F}$ raised from 0.75 to 1.00. Plot of Tan δ (FIG. 2b) confirmed this observation with the presence of a second transition around 50° C. The first peak at −30° C. corresponding to the $T_g$ decreased with $R_{M/F}$ whereas the second transition, observed at 50° C. increased with $R_{M/F}$. This second transition could be associated to the 7-stacking induced by the BM compound. Indeed, for low $R_{M/F}$, the quantity of BM in the network was probably too low to allow 7-stacking. On the contrary for higher $R_{M/F}$, the relative quantity of BM compared to the PI increase and allows the 7-stacking. The participation of H-bonding between the urethane functions coming from the grafting of the furan group could be ruled out as their quantity did not vary with $R_{M/F}$.

Figure 3:
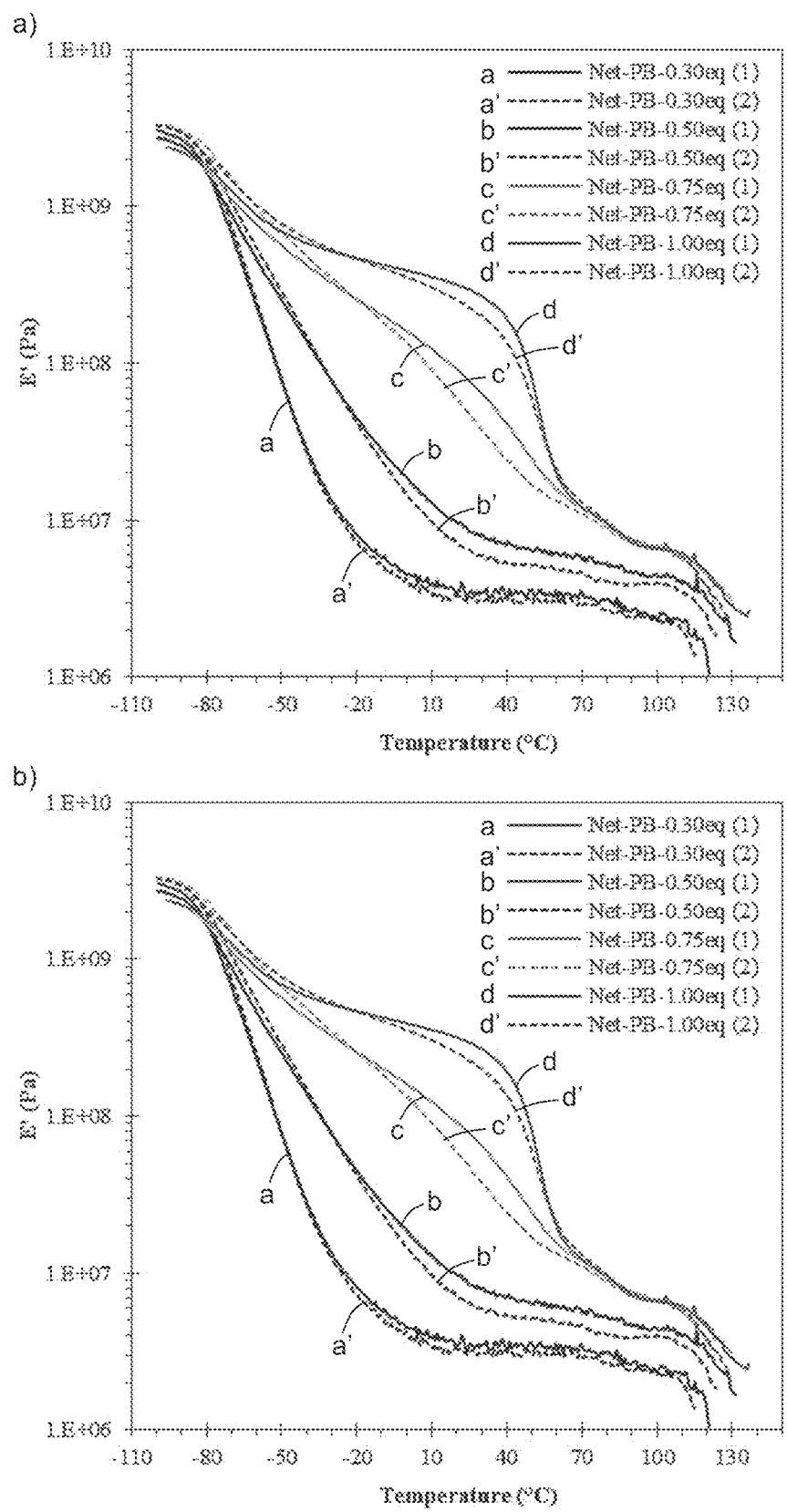
FIG. 3a-3b DMA analyses of the network of PB as a function of $R_{M/F}$.

PB networks showed a very similar behavior (FIG. 3a and FIG. 3b). All of the modulus values are reported in Table 3.

When $R_{M/F}$ was low, two plateaus were present like for PI networks. For higher $R_{M/F}$, a third plateau appeared between $T_g$ and 50° C. Again, increase of $R_{M/F}$ led to an increase of the moduli values except when this ratio reached 1.00. In this latter case, only the plateau with the 7-stacking contribution increased. Besides, the values of the elastic plateau were always superior for the PB networks.

Finally, recycling ability of all the networks was tested like for tensile test analyses. To this end, recycled strips were analyzed in DMA. Results are represented in dotted lines on FIG. 3a and FIG. 3b. It can be observed a pretty good superimposition of the curves obtained for the first and second molding confirming the good recycling ability of these materials.

Figure 4:
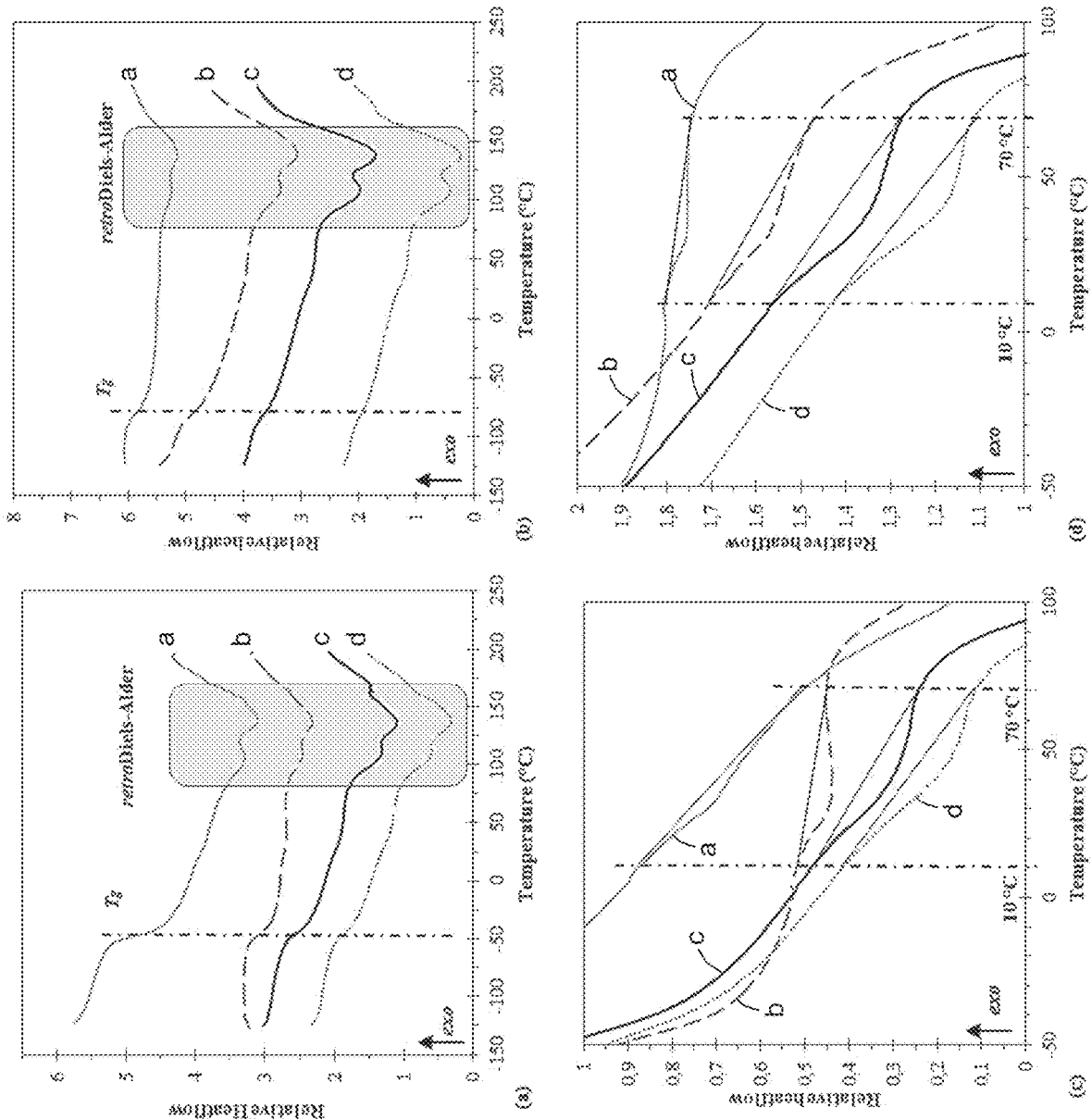
FIG. 4a-4d DSC thermograms.

To finish with, the networks were analyzed by DSC. Thermograms are represented on FIG. 4a-4c and values are given in Table 4.

TABLE 4

Mechanical properties of the networks characterized by tensile analyses and DMA, Tg and enthalpy value of the PI and PB network as a function of $R_{M/F}$ obtained by DSC

| Samples | $T_g$ (° C.) | Enthalpy (10 → 70° C.) (J/g) | Enthalpy (75 → 160° C.) (J/g) |
|---|---|---|---|
| Net-PI-0.30eq | −47.3 | 0.4 | 9.1 |
| Net-PI-0.50eq | −46.9 | 1.6 | 13.7 |
| Net-PI-0.75eq | −46.0 | 1.7 | 18.7 |
| Net-PI-1.00eq | −45.4 | 1.8 | 23.8 |
| Net-PB-0.30eq | −81.8 | 0.4 | 13.3 |
| Net-PB-0.50eq | −83.3 | 0.8 | 17.9 |
| Net-PB-0.75eq | −83.5 | 1.6 | 34.7 |
| Net-PB-1.00eq | −81.6 | 2.2 | 42.2 |

As observed in DMA, the $T_g$ did not depend on the $R_{M/F}$, −46° C. and −83° C. for PI and PB networks, respectively. At higher temperature, two endothermic peaks can be observed between 75° C. and 160° C. These signals could be associated to the rDA reaction. Moreover, these values were in good agreement with the results obtained by DMA where the flowing of the material was observed around 120-130° C. The presence of the two endothermic peaks is due to the formation of endo and exo-adducts during DA reaction (K. Roos, E. Dolci, S. Carlotti, S. Caillol, *Polym. Chem.* 2016, 7, 1612). The first peak starting at 75° C. is associated to the rDA of the endo-adduct (kinetic adduct) whereas the second one starting at 120° C. is associated to the exo-adduct (thermodynamic adduct). Besides, enthalpy of the rDA peaks increased with $R_{M/F}$ (from 9.1 J/g for $R_{M/F}$=0.30 to 23.8 J/g for $R_{M/F}$=1.00 for PI networks and from 13.3 J/g for $R_{M/F}$=0.30 to 42.2 J/g for $R_{M/F}$=1.00 for PB networks), as the quantity of DA adducts decreased with $R_{M/F}$.

Finally, the DSC analysis supported the presence of the transition observed in DMA at 50° C., associated to the 7-stacking of the BM. Indeed, another endothermic transition could be observed between 10 and 70° C. (FIG. 4c and FIG. 4d), with an increasing enthalpy intensity with RM/F, indicating more π-stacking with increasing maleimide quantity (Table 4).

Figure 5:
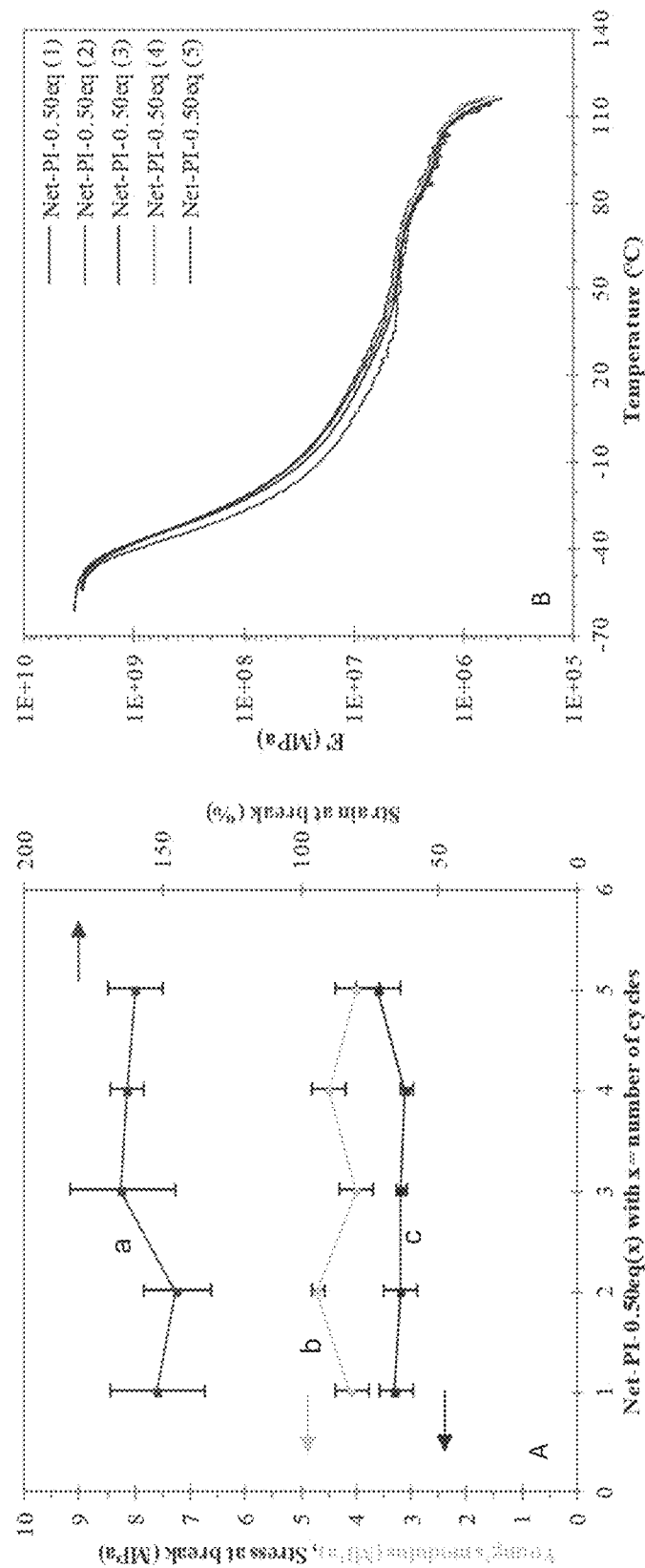
FIG. 5a-5b Tensile tests and DMA analyses of Net-PI-0.50 eq over 5 recycling cycles (A) Young's modulus, stress at break and strain at break obtained by tensile analyses.

To go further in the investigation of the recyclability of the networks, the PI network with $R_{M/F}$=0.50 was chosen to test its recyclability ability over 5 cycles of reprocessing. Tensile test analyses revealed an excellent stability of the properties even after 5 cycles of reprocessing (FIG. 5a and FIG. 5b and Table 5).

TABLE 5

Mechanical properties of Net-PI-0.50eq characterized by tensile analyses and DMA over 5 recycling processes.

| Cycle | Young modulus (MPa) | Stress at break (MPa) | Strain at break (%) | Tg (° C.) |
|---|---|---|---|---|
| 1 | 4.1 ± 0.3 | 3.3 ± 0.3 | 152 ± 17 | −29 |
| 2 | 4.7 ± 0.1 | 3.2 ± 0.3 | 145 ± 12 | −30 |
| 3 | 4.0 ± 0.3 | 3.3 ± 0.1 | 165 ± 19 | −28 |
| 4 | 4.5 ± 0.3 | 3.1 ± 0.1 | 163 ± 6 | −31 |
| 5 | 4.0 ± 0.4 | 3.6 ± 0.4 | 160 ± 10 | −32 |

| Cycle | Elastic modulus (20° C., MPa) | Elastic modulus (70° C., MPa) | Elastic modulus (90° C., MPa) |
|---|---|---|---|
| 1 | 6.8 | 3.4 | 1.7 |
| 2 | 7.6 | 3.6 | 1.6 |
| 3 | 8.4 | 3.3 | 1.7 |
| 4 | 7.3 | 3.6 | 1.7 |
| 5 | 5.5 | 3.1 | 1.7 |

For instance, the Young's modulus was always around 4-5 MPa and the stress at break around 3.5 MPa regardless the recycling cycle. In the same vain, the strain at break was always around 160% even after 5 cycles of recycling. DMA analyses confirmed the previous results as all the curves were nearly superimposed (FIG. 5b), the $T_g$, modulus and flowing temperature were also very close for all cycles (Table 5).

All of these results clearly showed the excellent recycling ability of these polymers, even after mechanical tests (tensile tests and DMA), without properties loss.

In conclusion, reversible covalent polymer networks with high recycling ability were prepared through a well-defined and controlled chemistry (no side reaction or uncontrolled cross-linking occurred during the synthesis). To this end, 1,4-cis liquid PI and PB were modified in 3 steps to graft furan groups that could react with a bis-maleimide compound to yield thermo-reversible elastomeric networks based on the Diels-Alder reaction. Starting from liquid polymers allowed an easier control of the chemical modifications, the washing steps and the processing compared to highly viscous high molar mass polymer generally used in such studies. Moreover, mechanical properties of the networks can be easily tuned by monitoring the ratio between furan and maleimide moieties with a storage modulus varying between 1 and 300 MPa. Besides, these elastomers showed a thermal stability over 110° C. and no properties loss even after 5 cycles of processing showing a good thermal and mechanical resistance.

The invention claimed is:

1. A compound having the following formula (I):

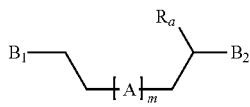
(I)

wherein:
m is an integer comprised between 1 and 10,000;
$B_1$ and $B_2$, independently of each other, have the following formula (B):

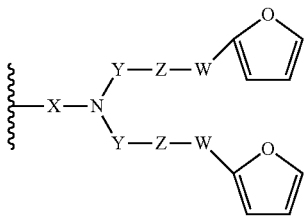
(B)

or the following formula (C):

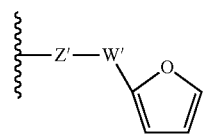
(C)

wherein:
X is:
a bond or
a group of formula —NH—$X_1$—, wherein $X_1$ is a linear or branched ($C_1$-$C_5$)alkylene group;
Y is selected from the linear and branched ($C_1$-$C_5$)alkylene groups;
Z and Z' are independently of each other —O— or —NH—;
W and W' are independently of each other selected from the group consisting of:
-C(=O)—NH—Y'—, —C(=O)—Y'—, and —Y'— groups, Y' representing a linear or branched ($C_1$-$C_5$)alkylene group;
$R_a$ is selected from the group consisting of: H, linear or branched ($C_1$-$C_5$)alkyl, and halogen atom;
A comprises at least one repeating unit having the following formula (U1)

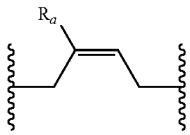
(U1)

and at least one repeating unit having one of the following formulae (U'1) and (U'2):

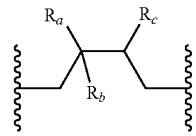
(U'1)

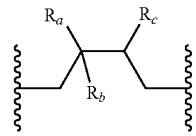
(U'2)

and optionally at least one further repeating unit having the following formula (U2):

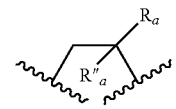
(U2)

wherein the repeating units of A are randomly distributed, and
wherein A comprises at least 5% in number of units (U1) in relation to the total number of units (U1), (U2), (U'1), and (U'2);
wherein:
$R_a$ is as defined above;
$R_a''$ is selected from the group consisting of H, —CH=$CH_2$, and —C(=$CH_2$)($R_a$), $R_a$ being as defined above;
$R_b$ is H and $R_c$ is $B_3$ having the formula (C) as defined above, or $R_b$ is $B_3$ having the formula (C) as defined above and $R_c$ is H;
A' is chosen from the following groups:

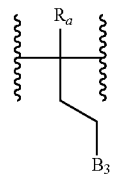
(1)

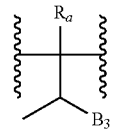
(2)

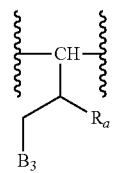
(3)

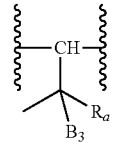
(4)

$R_a$ and $B_3$ being as defined above.

2. The compound of claim 1, wherein A comprises from 1 to 10,000 units (U1).

3. The compound of claim 1, wherein A comprises from 1 to 5,000 units (U'1) or (U'2).

4. The compound of claim 1, wherein $R_a$ is H or a $(C_1-C_5)$ alkyl group.

5. The compound of claim 4, wherein $R''_a$ is H.

6. The compound of claim 5, wherein each of $B_1$, $B_2$ and $B_3$ is of formula (C).

7. The compound of claim 6, wherein Z' is O, W' is —C(=O)—NH—Y' and Y' a methylene group.

8. The compound of claim 1, having the following formula:

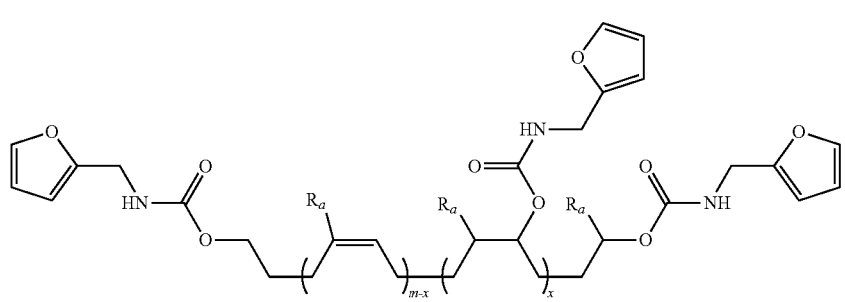

(I-1)

wherein:
  $R_a$ and m are as defined in claim 1; and
  x is an integer comprised between 1 and 10,000.

9. A process for the preparation of a compound of formula (I) according to claim 1, comprising the following steps:

a) the epoxidation of an aldehyde of formula (II):

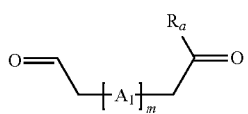

(II)

wherein:
  $R_a$ and m are as defined in claim 1;
  $A_1$ comprises at least one unit (U1) and optionally at least one unit (U2) as defined in claim 1;
in order to obtain a compound having the following formula (III):

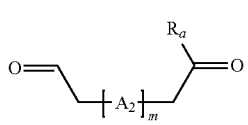

(III)

wherein:
  $A_2$ comprises at least one unit (U1) as defined in claim 1 and at least one unit (U3) having the following formula:

(U3)

m and $R_a$ being as defined in claim 1;

b) a reduction step of the compound of formula (III) with a reducing agent, in order to obtain the following compound having the below formula (IV):

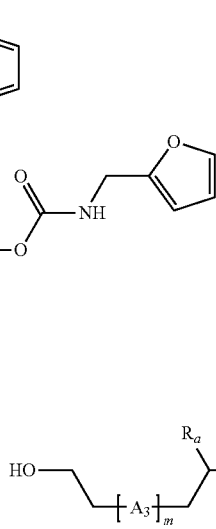

(IV)

wherein:
  $A_3$ comprises at least one unit (U1) as defined in claim 1 and at least one unit (U4) having the following formula:

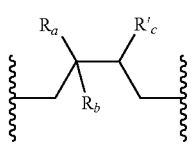

(U4)

$R_b$ is H and $R'_c$ is OH, or $R_b$ is OH and $R'_c$ is H;
m and $R_a$ being as defined in claim 1;

c) the reaction of the compound of formula (IV) with at least one functionalized furane having the following formula (V):

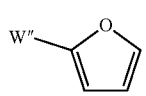

(V)

wherein W" is independently chosen from the group consisting of: —Y'—N=C=O, —Y'—C(=O)—Cl, —Y'—C(=O)—OH, —Y'—C(=O), and —Y'-Hal, Y' being as defined in claim 1 and Hal being an halogen atom;
in order to obtain a compound having the formula (I).

10. A polymer, obtained by the reaction of a compound of formula (I) as defined in claim 1, with a crosslinking agent comprising at least two maleimidyl groups.

11. The polymer of claim 10, wherein the crosslinking agent has the following formula (VII):

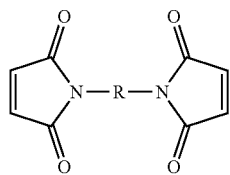

(VII)

wherein R is chosen from the group consisting of:
- a linear or branched $(C_{1-20})$alkylene, said alkylene being optionally interrupted by one or more heteroatom(s);
- a phenylene, said phenylene being optionally substituted by one or more substituent(s) selected from $(C_1-C_{10})$alkyl; and
- a phenylene-L-phenylene group, with L being selected from the group consisting of: a bond, $(C_1-C_6)$alkylene, —O— and —SO$_2$—.

12. A method of preparing an elastomer using the compound of claim 1 comprising the following steps:
a) conducting an epoxidation of an aldehyde of formula (II):

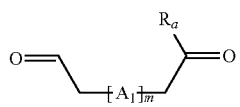

(II)

wherein:
$R_a$ and m are as defined in claim 1;
$A_1$ comprises at least one unit (U1) and optionally at least one unit (U2) as defined in claim 1;
in order to obtain a compound having the following formula (III):

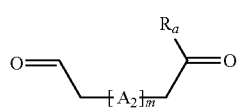

(III)

wherein:
$A_2$ comprises at least one unit (U1) as defined in claim 1 and at least one unit (U3) having the following formula:

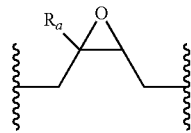

(U3)

m and $R_a$ being as defined in claim 1;
b) reducing the compound of formula (III) with a reducing agent, in order to obtain the following compound having the below formula (IV):

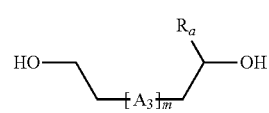

(IV)

wherein:
$A_3$ comprises at least one unit (U1) as defined in claim 1 and at least one unit (U4) having the following formula:

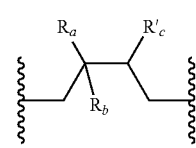

(U4)

$R_b$ is H and $R'_c$ is OH, or $R_b$ is OH and $R'_c$ is H;
m and $R_a$ being as defined in claim 1;
c) reacting the compound of formula (IV) with at least one functionalized furane having the following formula (V):

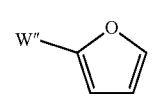

(V)

wherein W" is independently chosen from the group consisting of: —Y'—N=C=O, —Y'—C(=O)—Cl, —Y'—C(=O)—OH, —Y'—C(=O), and —Y'-Hal, Y' being as defined in claim 1 and Hal being an halogen atom;
in order to obtain a compound having the formula (I).

13. A composition comprising the polymer of claim 11, wherein the composition is adapted for use in tires, rubber seals, automotives, aerospace systems, anti-vibration systems, and buildings.

* * * * *